(12) United States Patent
Merrill et al.

(10) Patent No.: US 8,678,771 B2
(45) Date of Patent: Mar. 25, 2014

(54) PROCESS FOR MANUFACTURING A COMPONENT

(75) Inventors: Gary B. Merrill, Orlando, FL (US);
Andrew J. Burns, Longwood, FL (US);
Michael P. Appleby, Crozet, VA (US);
Iain Alasdair Fraser, Ruckersville, VA (US); John R. Paulus, Afton, VA (US)

(73) Assignees: Siemens Energy, Inc., Orlando, FL (US); Mikro Systems, Inc., Charlottesville, VA (US)

( * ) Notice: Subject to any disclaimer, the term of this patent is extended or adjusted under 35 U.S.C. 154(b) by 1004 days.

(21) Appl. No.: 12/637,030

(22) Filed: Dec. 14, 2009

(65) Prior Publication Data

US 2011/0143162 A1 Jun. 16, 2011

(51) Int. Cl.
*F01D 5/14* (2006.01)
*G06F 19/26* (2011.01)

(52) U.S. Cl.
USPC ......... 416/241 R; 416/223 A; 700/97; 700/98

(58) Field of Classification Search
USPC ...... 415/115, 200; 416/223 A, 223 R, 229 A, 416/229 R, 241 R; 700/97, 98
See application file for complete search history.

(56) References Cited

U.S. PATENT DOCUMENTS

| | | | |
|---|---|---|---|
| 3,301,526 A * | 1/1967 | Chamberlain | ............... 415/115 |
| 3,515,499 A | 6/1970 | Beer et al. | |
| 3,620,643 A | 11/1971 | Jones | |
| 3,927,952 A | 12/1975 | Kirby | |
| 4,314,794 A * | 2/1982 | Holden et al. | ............... 416/97 A |
| 6,197,424 B1 | 3/2001 | Morrison et al. | |
| 7,141,812 B2 | 11/2006 | Appleby et al. | |
| 7,153,096 B2 | 12/2006 | Thompson et al. | |
| 2002/0046873 A1 * | 4/2002 | Chung | ............... 174/137 R |
| 2006/0120874 A1 | 6/2006 | Burke et al. | |
| 2007/0128043 A1 | 6/2007 | Morrison et al. | |
| 2007/0140835 A1 | 6/2007 | Albrecht et al. | |
| 2007/0163114 A1 | 7/2007 | Johnson | |
| 2009/0028714 A1 * | 1/2009 | El-Wardany et al. | ..... 416/223 R |

FOREIGN PATENT DOCUMENTS

| | | |
|---|---|---|
| FR | 2824012 A1 | 10/2002 |
| GB | 2030233 A | 4/1980 |

OTHER PUBLICATIONS

Yadav, et al. "Thermomechanical Analysis of an Ultrasonic Rapid Manufacturing (URM) System"; In Journal of Manufacturing Processes, vol. 7, No. 2, Jan. 1, 2005; pp. 153-161.
Hardjadinata, et al.; "Rapid Prototyping by Laser Foil Bonding and Cutting: Thermomechanical Modeling and Process Optimization"; In Journal of Manufacturing Processes, vol. 3, No. 2, Jan. 1, 2001; pp. 108-119.

* cited by examiner

*Primary Examiner* — Edward Look
*Assistant Examiner* — Jason Davis

(57) ABSTRACT

A method of manufacturing a component, including providing a three-dimensional computer model of the component to be produced; deconstructing the three-dimensional computer model by defining a plurality of model slices; forming a plurality of metallic foils, where each foil corresponds to a specific model slice; assembling the plurality of formed foils in a tool to form a three-dimensional component stack; and bonding the three-dimensional component stack to form the component. Characteristics of the foils may differ in various portions of the stack, such as being a different material, having a different thickness, or having a different grain orientation. The control of dimensional tolerances of internal structures, such as cooling passages, in three dimensions is devolved into two separate steps of 1) selecting a thickness of each slice/foil, and 2) controlling in two dimensions a material removal process applied to the respective foil.

26 Claims, 10 Drawing Sheets

PROCESS FOR MANUFACTURING A COMPONENT

FIELD OF THE INVENTION

The present invention provides a method for manufacturing a component and the resulting component produced therefrom.

BACKGROUND OF THE INVENTION

Due to current tooling limitations in casting technologies, intricate geometric details such as fine cooling passages typically cannot be cast into a component and must be formed in a subsequent machining step. Furthermore, components that must operate in high temperature environments, such as gas turbine airfoils for example, typically are formed from high temperature materials such as nickel, cobalt or iron based super alloys which have poor machineability which adds to the overall difficulty of forming the final component part.

The TOMO lithographic process is a manufacturing process for producing complex, net-shape, micro-to-meter scale structures, as described in U.S. Pat. No. 7,141,812 B2, incorporated by reference herein. The TOMO process uses a lithographic etching method to manufacture master tooling from copper or other metallic foils in extremely accurate form. The foils are produced from a 3-D digital model that is transformed into a series of cross-sectional slices of the desired 3-D solid. The foils are produced by first applying a controlled thickness coating of photo-sensitive polymer to both surfaces of the foil and then overlaying photomasks onto both surfaces of the foil. The multilayer structure is then exposed to UV light which polymerizes the exposed photosensitive polymer coating in areas not covered by the photomasks. The photomasks are then removed. The unexposed photoresist polymer is then removed chemically leaving the exposed regions of the polymer film firmly printed on the surface of the foil. The foil is then etched to remove the exposed surface, resulting in a foil print which is subsequently stacked with other foils and bonded together to form a master tool used for development of investment casting molds.

BRIEF DESCRIPTION OF THE DRAWINGS

The invention is explained in the following description in view of the drawings that show.

DETAILED DESCRIPTION OF THE INVENTION

The present inventor has realized that a master tool produced by a TOMO process can be utilized for the development of casting molds from which a final high temperature component, such as a gas turbine blade, can be cast using traditional casting techniques. Furthermore, the present inventor has realized that the high temperature component itself may be formed directly with the TOMO process by producing foils made of a super alloy material. The direct application of the TOMO process to forming a component rather than for forming a mold for a component may lower the overall cost and schedule necessary for producing the component.

Figure 1:
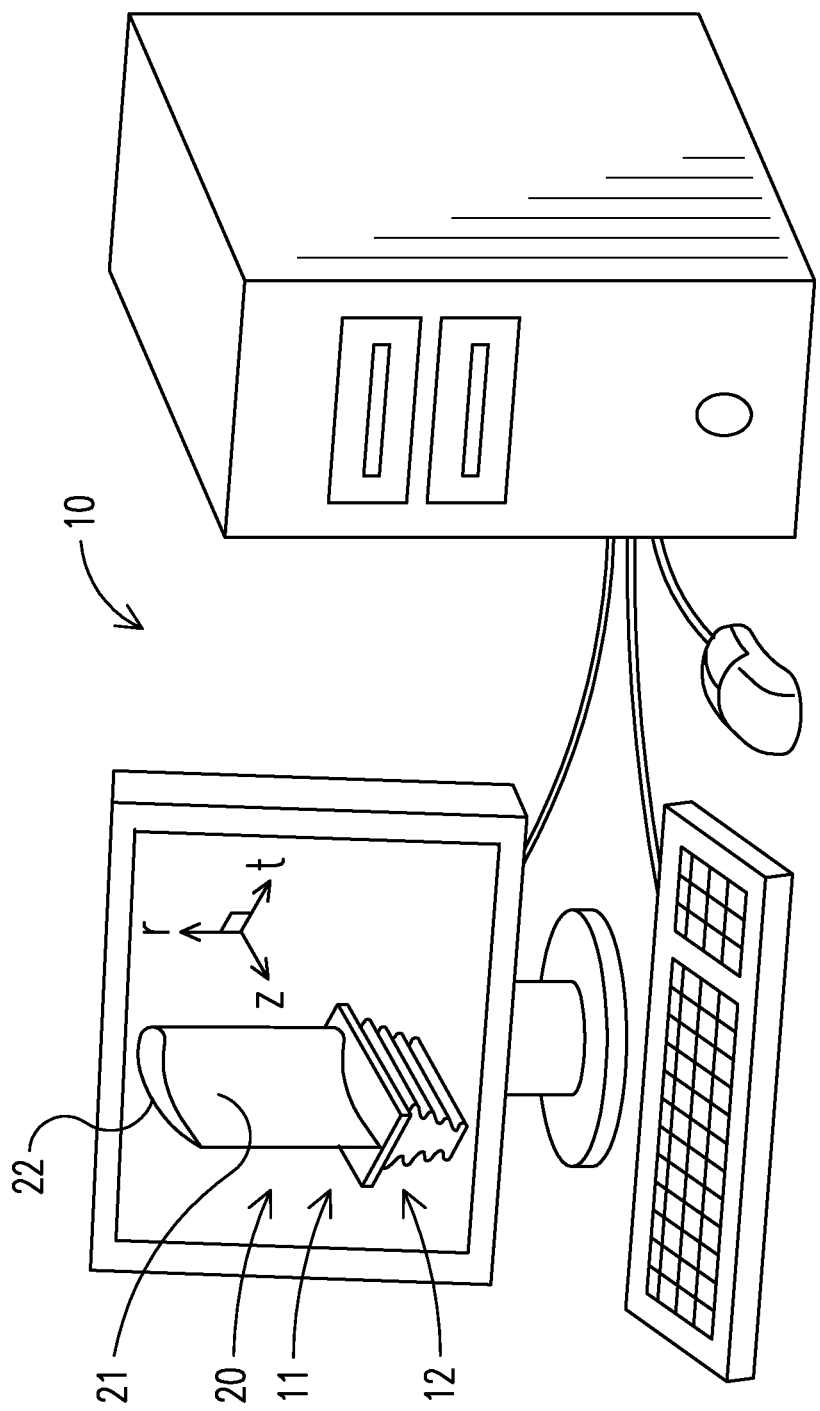
FIG. 1 is a 3-D computer model of a component.

Referring to FIG. 1, a three dimensional (3-D) computer model of a component 10, for example a 3-D model of a gas turbine blade, is provided. A gas turbine blade 11 includes a root portion 12 that attaches the blade 11 to a rotational shaft (not shown) and an airfoil section 20 arranged radially outboard of the root portion 12. The airfoil section 20 is comprised of a pressure side 21 and a suction side 22. The 3-D model 10 can be segmented or deconstructed into layers as seen in FIGS. 3, 5 and 6.

Figure 2:
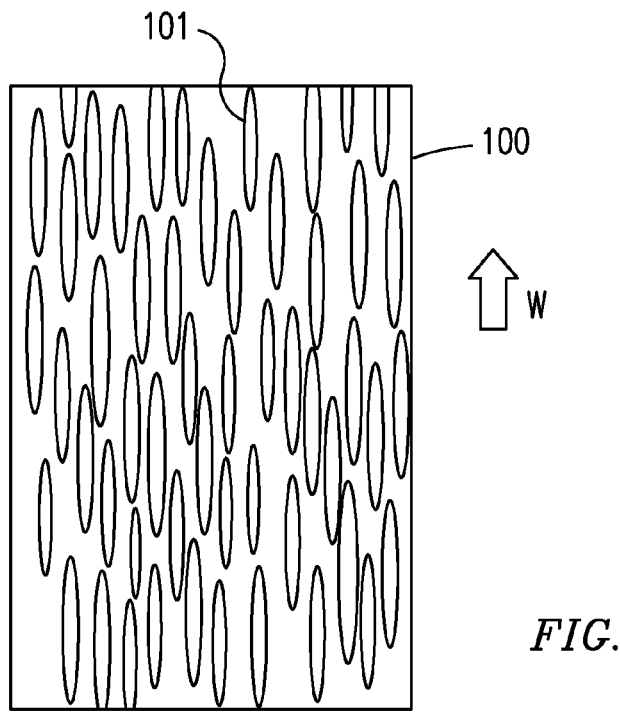
FIG. 2 is a worked foil.

In one embodiment, the present invention takes advantage of the concept of highly cold working, for example rolling, high temperature capable metallic materials, for example nickel, cobalt or iron based super alloys, into thin foils 100 as illustrated in FIG. 2. The high temperature capable metallic materials are highly cold rolled to provide a foil having a thickness of between 25 and 1000 microns, for example. The resulting foil 100 will have highly directionally oriented material properties oriented in the direction of rolling W due to distortion of the grain boundaries of the pre-worked base material, see FIG. 2. The previously isotropic material properties of the pre-worked base material become anisotropic due to the orientation of the deformed grain structure 101 resulting from the rolling process. Also, an improvement in certain material properties such as yield strength over the pre-worked base material can be realized due to the increase in dislocation density due to the highly worked nature of the foil 100. Typically, the blank foil 100 is produced from a base material in the form of a cast billet or a powder pressed billet, however, other material forms can be used and are within the scope of the present invention.

Figure 3:
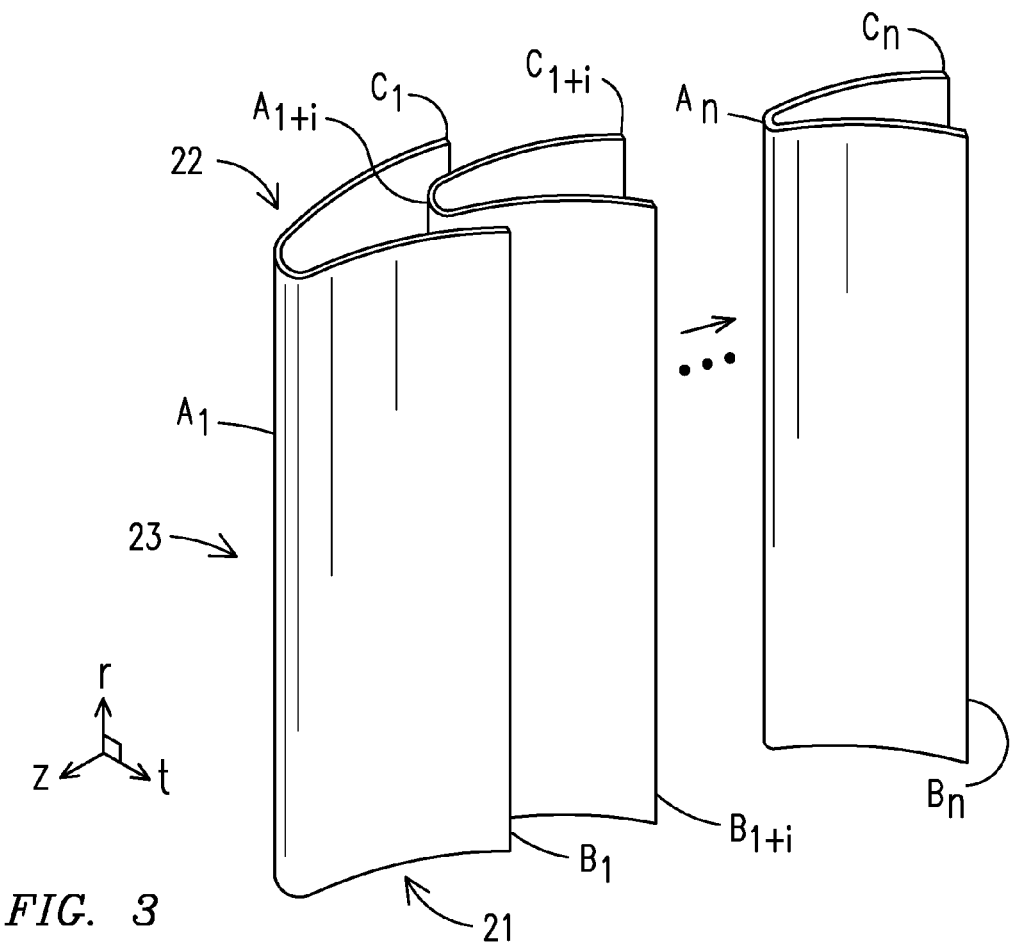
FIG. 3 is an exploded view of a sectioned blade trailing edge model of FIG. 1.
Figure 4:
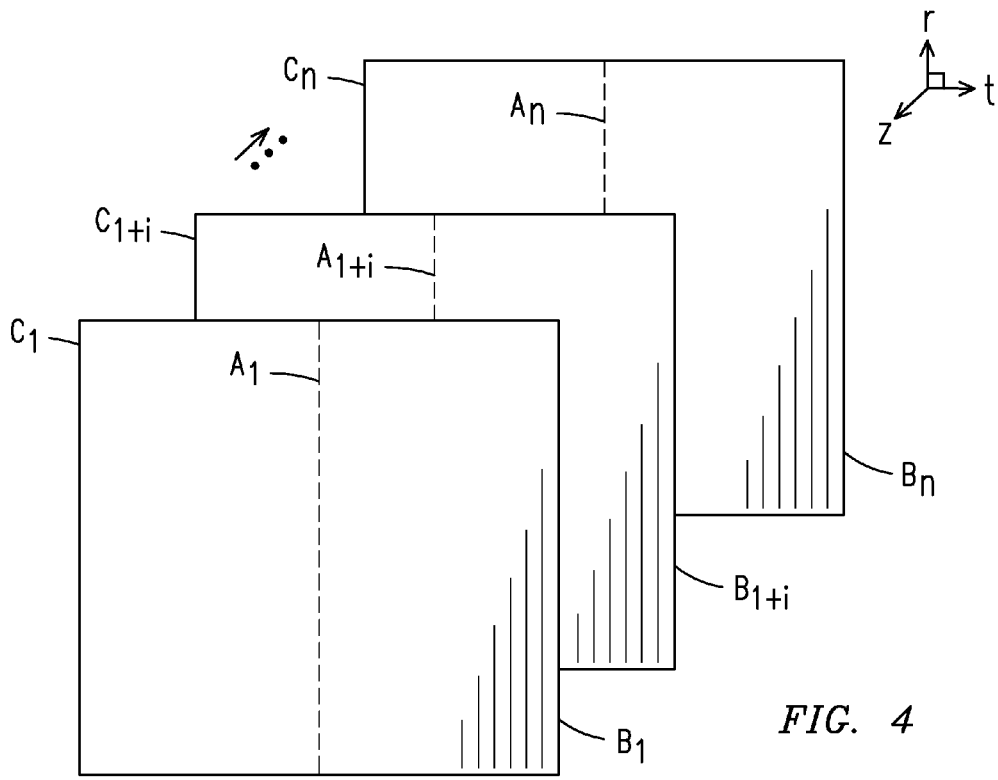
FIG. 4 is a flattened sectioned model of the trailing edge of FIG. 3.

FIG. 3 shows one particular way to segment a trailing edge portion 23 of the 3-D model 10 into sections that each generally parallel the outer surface and wrap around the trailing edge from the pressure side 21 to the suction side 22 where the trailing edge segments are identified with the letter A, the pressure side trailing edge region with B and the suction side trailing edge region with C. Since these sections may subsequently be recreated in metal foils as part of the TOMO process, it will be appreciated that there may be a certain minimum radius of curvature that can actually be achieved for the material of a particular application. The wall thickness of the trailing edge portion 23 can be divided or sliced into a plurality of sections, or in other words, into n sections where a first section is identified as the 1 section, the a subsequent section being the 1+i section and so on to the final section being the nth section as seen in FIG. 3. Furthermore, any specific section in the stack of sections 1 to n may be referred to as the ith section. Therefore, the first section slice has the $A_1$ trailing edge, the $B_1$ pressure side trailing edge region and the $C_1$ suction side trailing edge region as seen in FIG. 3. Subsequently, the 1+i to the nth sections comprise the $A_{1+i}$ to $A_n$ trailing edges, the $B_{1+1}$ to $B_n$ pressure side trailing edge regions and the $C_{1+i}$ to $C_n$ suction side trailing edge regions. FIG. 4 shows the 1st to nth sections from FIG. 3 flattened out into a planar configuration as may be done conveniently with existing computer aided design software systems.

Figure 5:
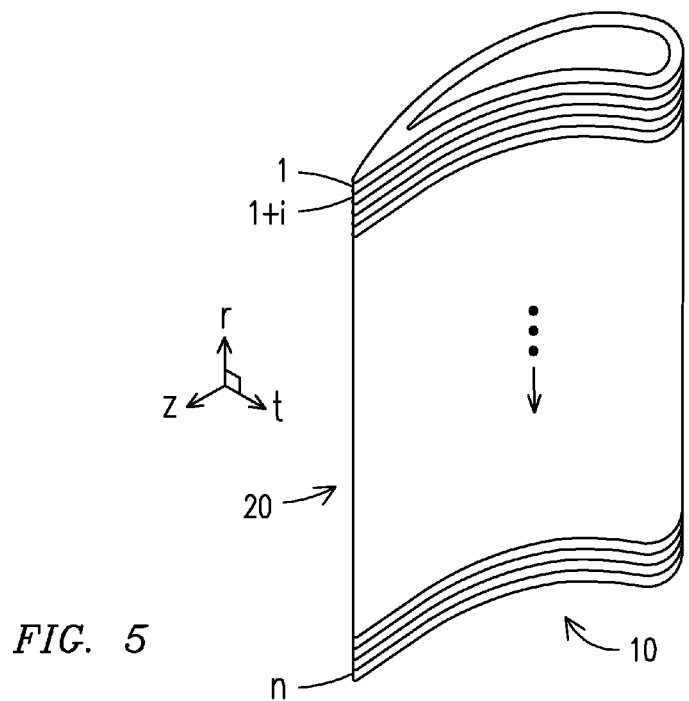
FIG. 5 is a radially sectioned model of FIG. 1.
Figure 6:
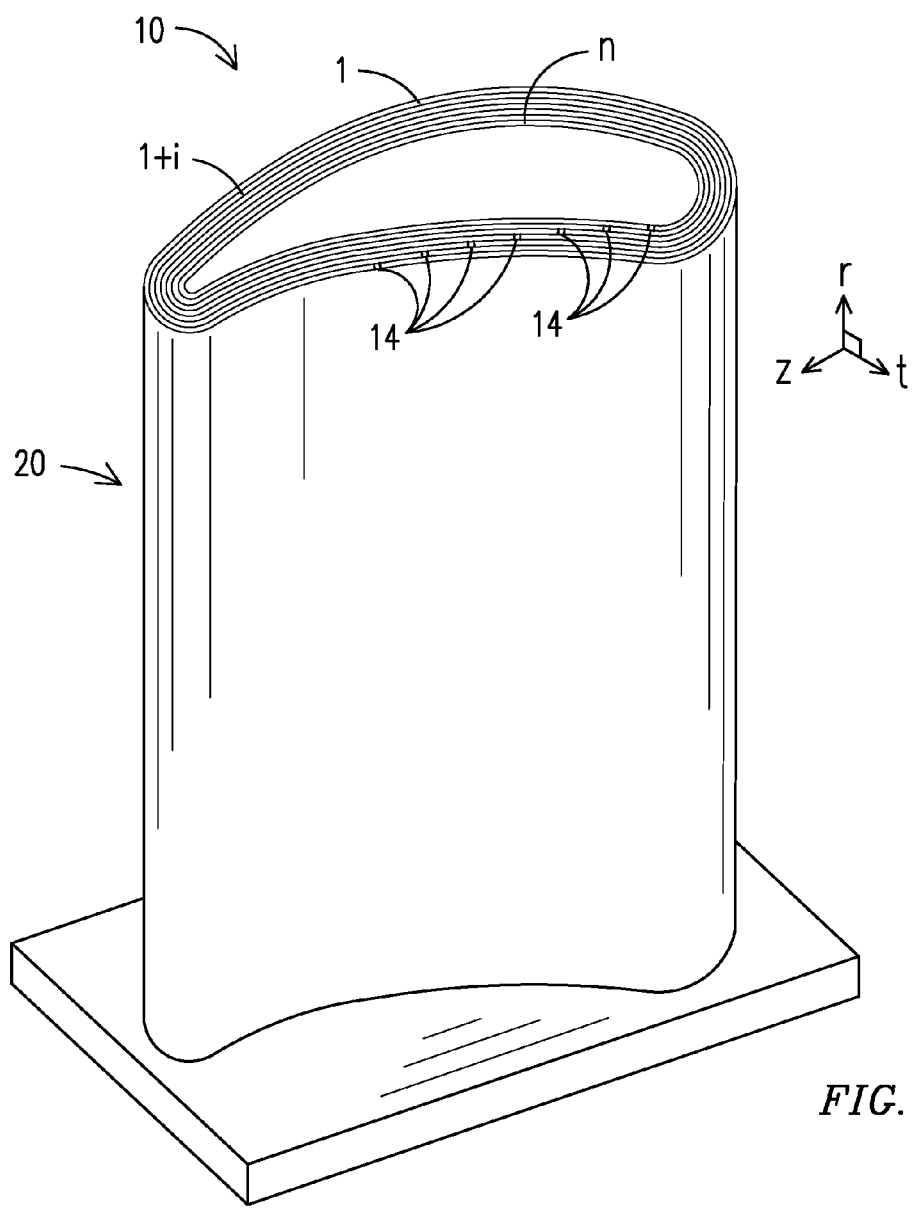
FIG. 6 is a further sectioned model of FIG. 1.

FIG. 5 shows another particular way to divide or slice the airfoil portion 20 of the model 10 by sectioning the airfoil in the radial direction r of the blade with respect to a rotational axis of the gas turbine (not shown). The airfoil 20 can be divided into a plurality of sections, or in other words into n sections, where a first section is identified as the ith section, the second section being the i+1 section and so on to the final section being the nth section as seen in FIG. 5. Here, each ith model section represents an instantaneous cross section of the airfoil portion 20 along a radial axis. The respective slices are then stacked atop each other.

Figure 7:
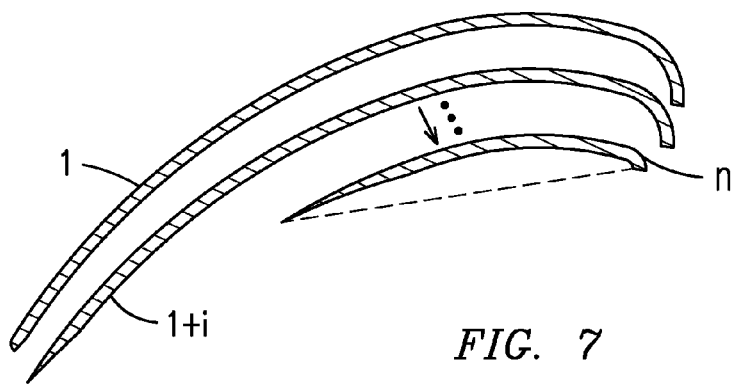
FIG. 7 is an exploded view of a portion of the sectioned model of FIG. 6.

FIG. 6 shows an airfoil portion 20 of the model 10 sectioned into constant thickness layers, where the respective slices are laid up sequentially around a central mold (not shown). Gaps 14 where opposed edges of the respective layers adjoin are preferably not aligned to avoid a structurally weakened area, unless such a design feature is desired. FIG. 7 shows several of the sections of FIG. 6 exploded for clarity.

The specific thickness of a given section, the ith section, of FIGS. 3, 5, and 6 will depend on a level of accuracy needed to describe the specific geometric features and/or the directionally oriented material properties of the ith section. The thickness of the section/foils may be the same throughout a component or they may differ in different sections of the component. The thickness of a respective slice may be selected in response to a level of geometric detail of the component in a region of the respective slice, with not all slices having a like thickness. For example, a particular section of the component containing finely detailed geometries, such as cooling channel geometries, may be formed using relatively thinner sections/foils, and relatively thicker sections/foils may be used in areas where no particularly detailed geometry is present in the component. This process may be described as "discretizing" a component.

Figure 8:
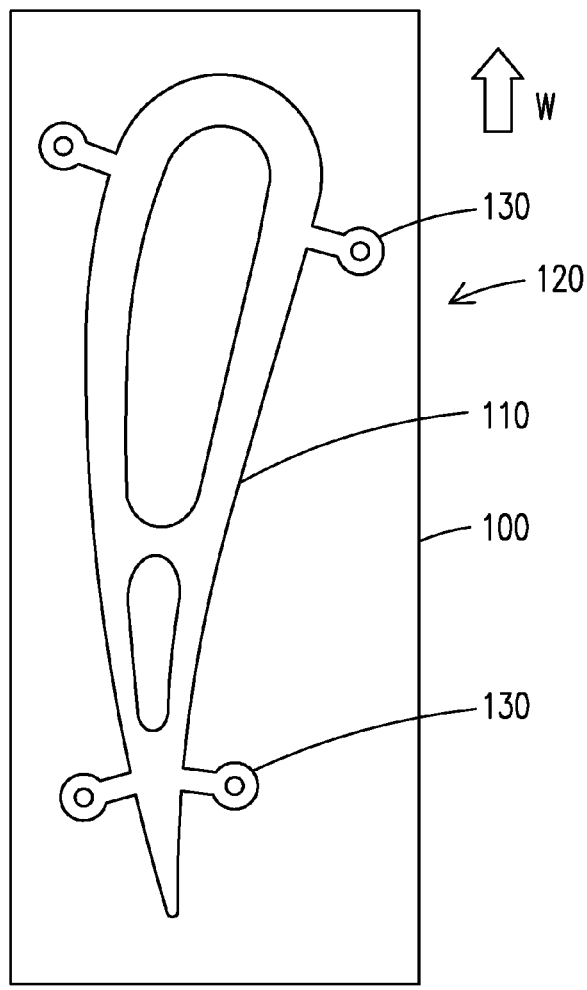
FIG. 8 is an $i_{th}$ foil layer prior to machining.
Figure 9:
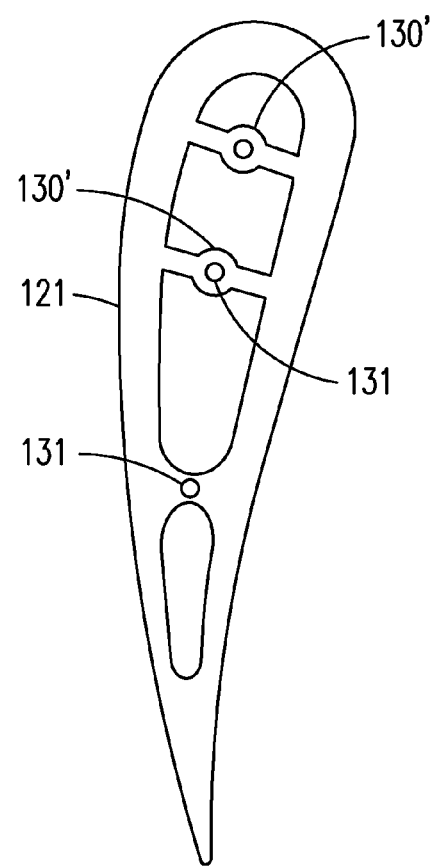
FIG. 9 is an $i_{th}$ foil layer after machining.

Once the 3-D model 10 is sectioned and the foils 100 are formed, actual ith foil layers 121, as shown in FIG. 9, can be manufactured in accordance with the flattened version of the ith model section. For example, photo-machining the foil layer 100 via a lithographic etching process can be utilized to manufacture the ith foil layers 121, wherein a photo resist layer 110 can be applied onto both a top and bottom surface of the foil layer 100 to form a pre-machined ith foil layer 120 as seen in FIG. 8. Exposed metal can then be etched away using a caustic solution suitable for dissolving the specific metallic foil material. For example, an aqueous solution of ferric chloride can be used. After the foil is etched, the photo resist layers can be stripped from the foil such that the ith foil layer 121 results as seen in FIG. 9. However, the present invention is not limited in scope by the specific method of foil production or machining. Other methods of forming foils are envisioned as well as other methods suitable for the production of the ith foil layer 121, for example laser cutting.

Figure 10:
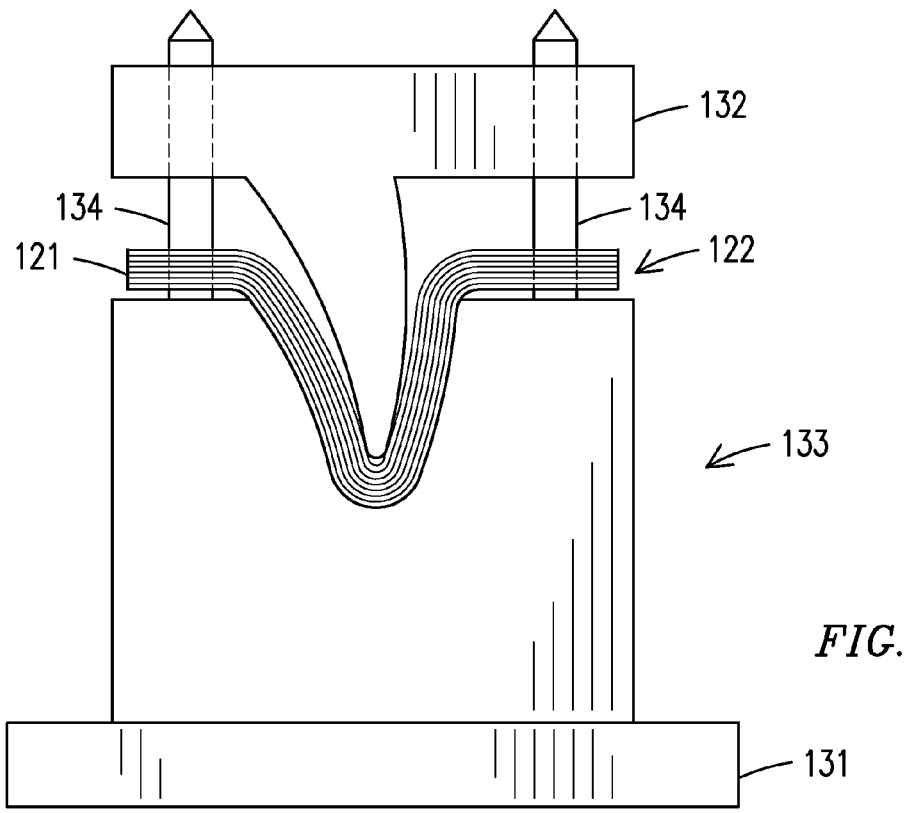
FIG. 10 is a 3-D component stack in a non-flat two piece tool per the model of FIG. 3.
Figure 11:
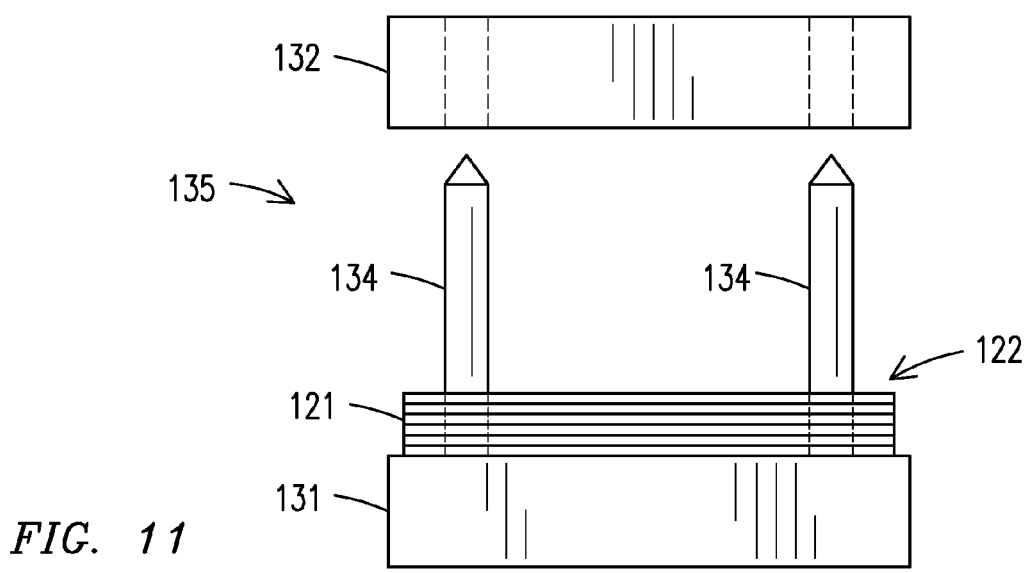
FIG. 11 is a 3-D component stack in a flat two piece tool per the model of FIG. 5.
Figure 12:
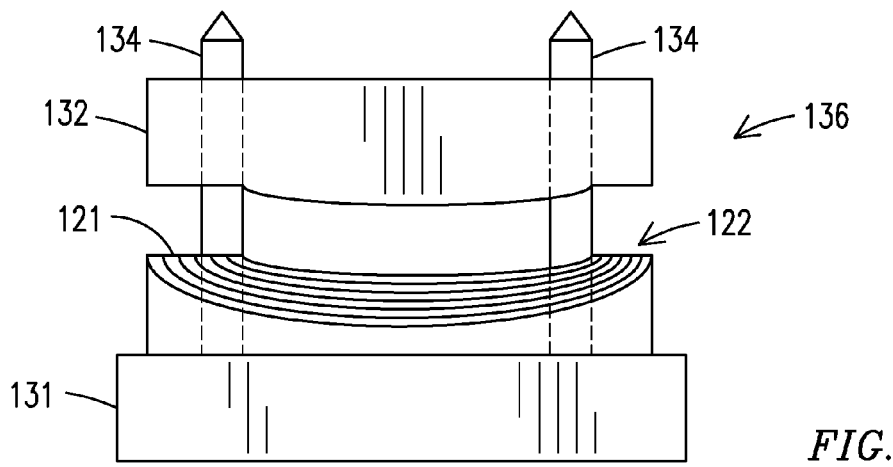
FIG. 12 is a 3-D component stack in a non-flat two piece tool per the model of FIG. 6.

Referring again to FIG. 9, each ith foil layer may include alignment tabs 130, 130' that work in conjunction with alignment pins 134 of stacking tools to accurately control the proper alignment of the ith foil layer with respect to each other. FIGS. 10, 11 and 12 show the ith foil layers 121 stacked together in alternative two piece forming tools 133, 135, 136 (each of which includes an upper portion 132) which form a respective component stack 122 that represents a reconstructed physical component in accordance with the deconstructed or segmented 3-D model 10.

Figure 13:
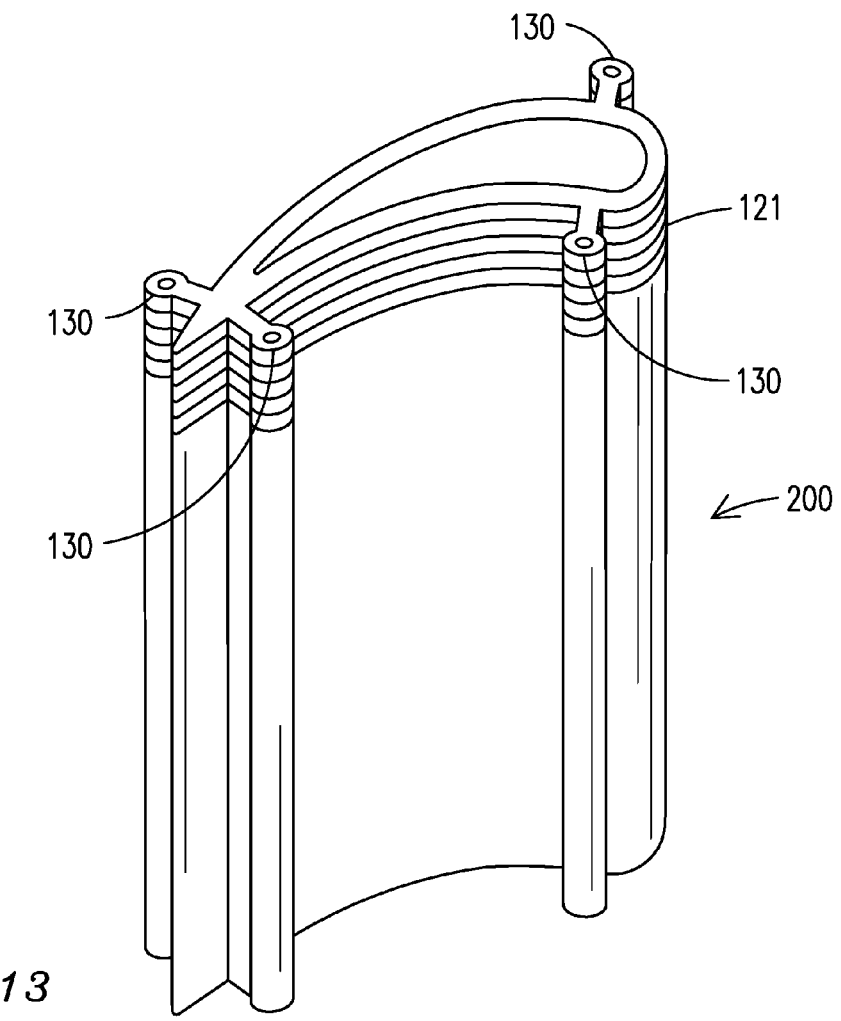
FIG. 13 is a bonded 3-D component.

Once the component stack 122 is formed on the two piece forming tool 133, 135, 136, the foils 121 can be bonded together to form a 3-D component part 200 as seen in FIG. 13 for example. The alignment tabs 130 can be removed in a subsequent gross material removal machining process. Alternatively, as least some or all of the alignment tabs may be retained as part of the finished component. Alignment tabs 130' of FIG. 9 are shown as a retained structure functioning as ribs interconnecting and adding strength to the opposed suction and pressure side walls. The alignment tabs 130' also function as a portion of a wall of a cooling passage formed in the airfoil core by dividing an interior space of the airfoil into respective channels. In addition to receiving the alignment pins 134 during the stacking process, the alignment tabs 130' may also function to receive a bolt or other form of fastener (not shown) in the formed component in order to provide additional strength to the joined stack. The alignment tabs 130, 130' are illustrated as including a hole 131 for receiving the pins 134, but other geometries may be used as the indexing feature of other embodiments of alignment tabs, such as a notch, curve, groove, etc. The indexing feature is used to ensure that each foil is in its proper position prior to bonding the foils together so that the desired component shape is achieved.

The foils 121 may be joined in such a way that a near metallurgically perfect joint between each foil is established. Diffusion bonding is an acceptable in-situ method of joining the foils. Diffusion bonding is a solid state joining method capable of joining a wide range of metallic combinations of which scale is not an issue. The diffusion bonding process is dependant on a number of parameters such as time, applied pressure, temperature and method of heat application. The external force applied to the component stack 122 during diffusion bonding is below what would cause macro deformation of the parent materials, typically contact pressure of 3 to 10 MPa. The heat applied is typically provided via radiant, induction, direct or indirect resistance heating. Typically, the applied diffusion bonding temperature is 0.5-0.8 of the melting temperature (° K) of the individual ith foil layer 121 of the base materials being bonded. Diffusion bonding can be performed in an inert environment or a vacuum to ensure the best possible joint bond quality; however, other atmospheres are not excluded. Diffusion bonding times at temperature typically range from 1 to 100 minutes but is largely dependant upon the specific material being diffusion bonded.

Surface finish is an important factor in ensuring an acceptable quality diffusion bond. To form an acceptable bond, the bonding surfaces must come into atomic contact to begin the bonding process. Surface finish of less than 0.4 microns RA is typically required. Once the diffusion bonding process begins, the applied load causes plastic deformation of surface asperities, resulting in the continuation of bond development by diffusion controlled mechanisms including grain boundary diffusion, and power law creep.

Hot isostatic pressing (HIP) is a variant of diffusion bonding where the externally applied contact pressures range between 100 and 200 MPa. The bond quality associated with HIP is less sensitive to surface finish, therefore surface finish of 5.0 microns RA is acceptable. Additionally, complete geometries can be bonded with a HIP bonding method.

A modified diffusion bonding approach better suited to bond materials that resist diffusion bonding (such as materials with high levels of grain boundary oxides) is a liquid phase diffusion bonding process. For liquid phase diffusion bonding, a thin layer of a lower melting temperature material is placed between the foils to form a liquid interface between the foils during bonding. Once cooled, the lower melting temperature material layer forms a solid interface between the layers which can then be diffused away into the adjacent foil layers in subsequent diffusion heat treatments resulting in a true diffusion bonded joint. The joining process should be controlled so that it does not destroy any desired grain orientation of the individual foils for applications benefiting from such grain directionality.

The overall properties of the resultant component 200 are determined by the properties and geometry of each individual foil layer 121. Therefore, by determining the specific base material, layer thickness, deformed grain structure orientation, and cross sectional geometry, the properties of not just each foil layer 121 but the global properties of the component stack 122 and therefore the resultant component 200 can be controlled. For example, a foil base material having a relatively greater ultimate strength can be alternated with a foil having a relatively greater impact toughness to produce a resulting component 200 having improved global toughness and ultimate strength properties over either of the individual materials alone. In another example, the deformed grain structure orientation of adjacent foils can be the same in order to provide improved strength in a particular direction or to improve damage tolerance such as creep, crack propagation, and/or corrosion. Alternatively, the grains structure orientation can vary among the foils or in different regions of the component in order to tailor the resulting material properties of the bonded stack to the expected operating properties of the formed component. Furthermore, there are numerous variations of material properties that can be tailored by varying the combination of material, layer thickness, deformed grain structure orientation, and cross sectional geometry; therefore the previously mentioned examples are not limiting in scope of the present invention. Care must be given when applying any heat treatment associated with the foils 121 to ensure that excessive time and/or temperature is not applied such that the advantages mentioned herein may be lost due to annealing or excessive grain reformation and loss of dislocation density.

Furthermore, by selectively controlling the sectioning of the 3-D model and the printing of the photo-resist 110 on the foil 100 to form the individual foils 121, intricate geometric details, for example geometrically complex internal cooling passages, can be formed directly into the component stack 122 that can not typically be formed by existing casting technologies due to tooling pull plane limitation. In particular, complex non-linear cooling passages may be formed through the component by forming holes in the respective metallic foils corresponding to respective locations of the cooling passage in respective model slices, such that the holes in the assembled component stack define the non-linear cooling passage. Therefore, benefits of the invention include enablement of direct manufacturing of high temperature capable, difficult to work materials with intricate features and the manufacture of otherwise non-manufacturable advanced cooling schemes.

Figure 14:
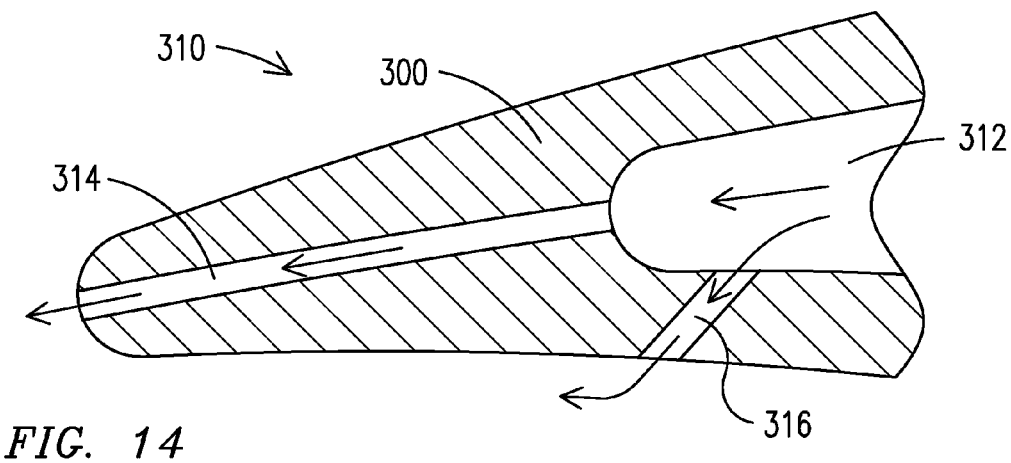
FIG. 14 is a partial cross-sectional view of a prior art turbine blade cooling scheme utilizing a straight mid-section cooling channel.

FIG. 14 is a partial cross-sectional view of a prior art turbine blade 300 illustrating a known cooling scheme for cooling the trailing edge portion 310 of the blade 300. Arrows indicate the flow of cooling air from a central cooling channel 312, through a straight mid-section cooling passage 314 which has been formed by a known drilling or electro-discharge machining (EDM) operation. This prior art scheme is adequate for many applications, but for more advanced and higher temperature applications, the mid-section location of the cooling passage 314 may be problematic. Alternatively, surface film cooling may be provided for the blade 300 by drilling a straight cooling passage 316 from a pressure or suction side surface of the blade 300 into the central cooling channel 312. However, surface film cooling is known to interfere with the flow of the working fluid over the airfoil, thereby adversely impacting the performance of the machine. Existing drilling, machining and casting technologies provide no mechanism for forming non-linear near-surface cooling passages in this region of a turbine blade.

Figure 15:
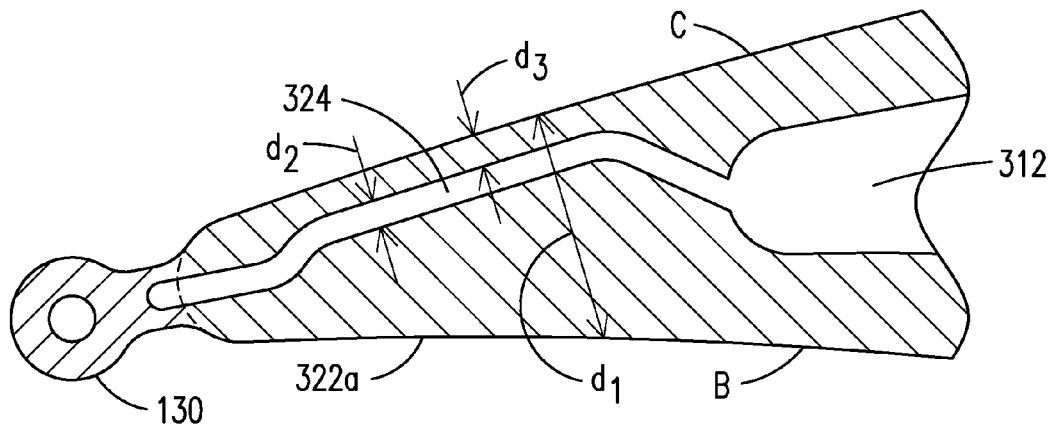
FIG. 15 is a partial top view of a first foil used to form a turbine blade having non-linear near-surface cooling channels.
Figure 16:
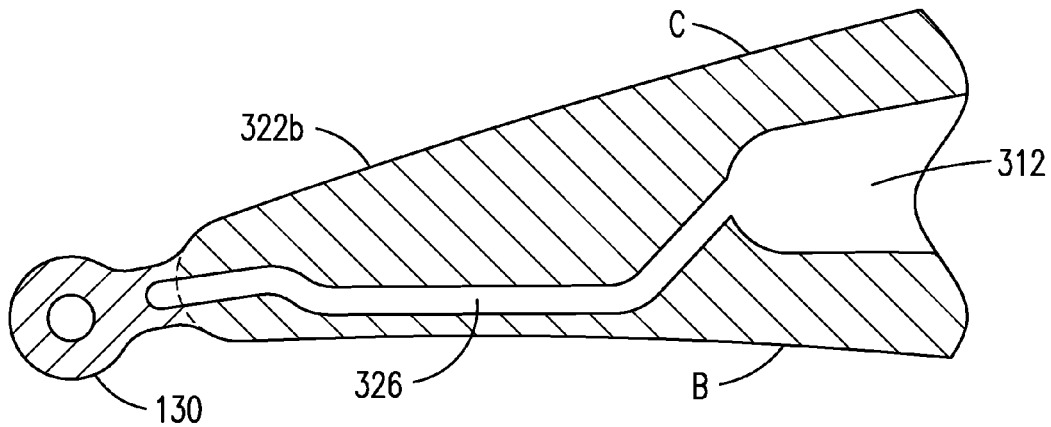
FIG. 16 is a partial top view of a second foil used to form a turbine blade having non-linear near-surface cooling channels.
Figure 17:
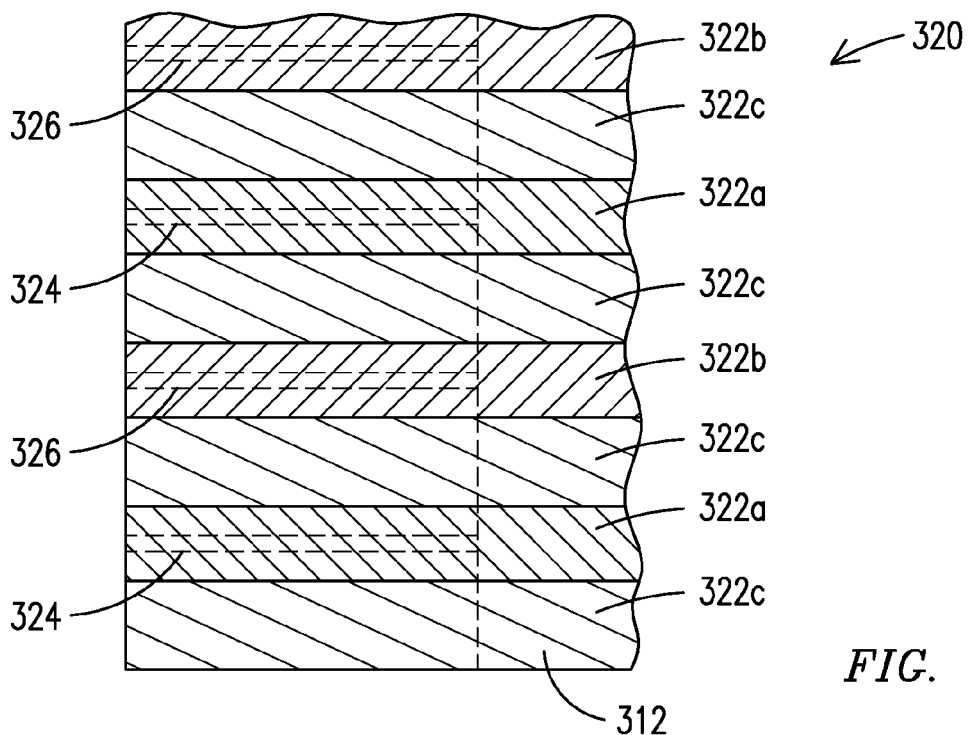
FIG. 17 is a partial plan view of a turbine blade formed using the foils of FIGS. 15 and 16.

An embodiment of the present invention which overcomes this limitation of the prior art is illustrated in FIGS. 15-17. FIG. 17 is a partial plan view of a turbine blade 320 formed by a bonded stack of metallic foil layers 322a, 322b, 322c. Foil layers 322a are all the same and are illustrated in a state of manufacturing in FIG. 15. Foil layers 322b are all the same and are illustrated in a state of manufacturing in FIG. 16. Each foil layer has been formed by the processes described above to have an exterior edge that when stacked with other foils defines the pressure side, suction side and trailing edge of the airfoil 320. In addition, each foil includes an interior area where material has been removed to define an edge such that when stacked with other foils define an interior cooling channel 312 of the blade 320. Foils 322a also have material removed to define a non-linear cooling channel 324 which when stacked with other foils will be proximate a suction side C of the blade 320. Foils 322b have material removed to define a non-linear cooling channel 326 which when stacked with other foils will be proximate a pressure side B of the blade 320. The foils may also have an alignment tab 130 formed at the trailing edge of the foil, and the respective cooling passages 324, 326 may extend partially into the alignment tab 130, so that when the tabs are later removed to form the trailing edge surface as indicated by the dashed lines in FIGS. 15 and 16, the cooling passages 324, 326 will provide open, non-linear, near surface cooling passages proximate the respective pressure and suction side surfaces. As shown in FIG. 17, foils 322a and 322b may be separated by foils 322c which have no such cooling passages, to form the final structure of the turbine blade 320. Other geometries and locations of non-linear cooling passages may be formed in other embodiments.

With prior art casting processes it is difficult to control the dimensional tolerances of not only external features (such as airfoil shape), but especially of internal features (such as cavities or cooling passages) of a component. The present invention overcomes this problem by changing the focus of dimension control from the final finished product to the control of dimensions of a metallic foil. The control of dimensions of an interior three-dimensional feature of a component is devolved into two-dimensional control of material removal from a flat, thin foil. It will be appreciated that the processes described herein to remove material to define the final foil shapes can be very precisely controlled, such as with tolerances on the order to ±25 microns. As such, the dimensions of a component such as a turbine blade, including the overall outer airfoil shape dimensions $d_1$, the size of the cooling passage $d_2$, and the proximity of the cooling passage to the outer surface $d_3$, may be controlled to a degree not previously achievable with prior art processes. Control of the dimensional tolerances of the interior and exterior features of a component is accomplished in the methods described herein by controlling dimensional tolerances in the material removing process and by selecting an appropriate thickness for each respective foil. By using thin slices and highly accurate wafer material removing processes, it is now possible to control the dimensions of a component to a much tighter tolerance than is possible with known casting and machining processes, thereby enabling novel designs that heretofore were not contemplated.

Figure 18:
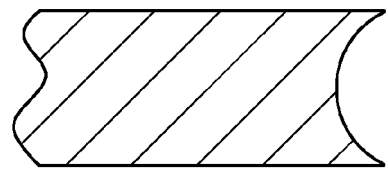
FIGS. 18-20 illustrate three different edge configurations that may be formed on a metallic foil and advantageously applied for heat transfer and fluid dynamics purposes.
Figure 19:
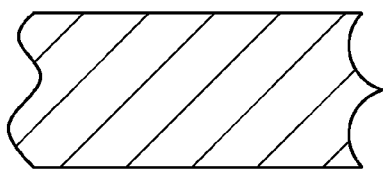
Figure 20:
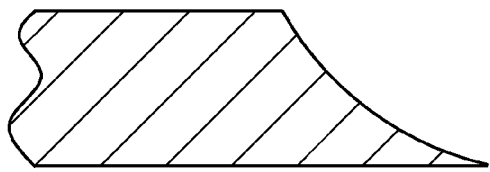
Figure 21:
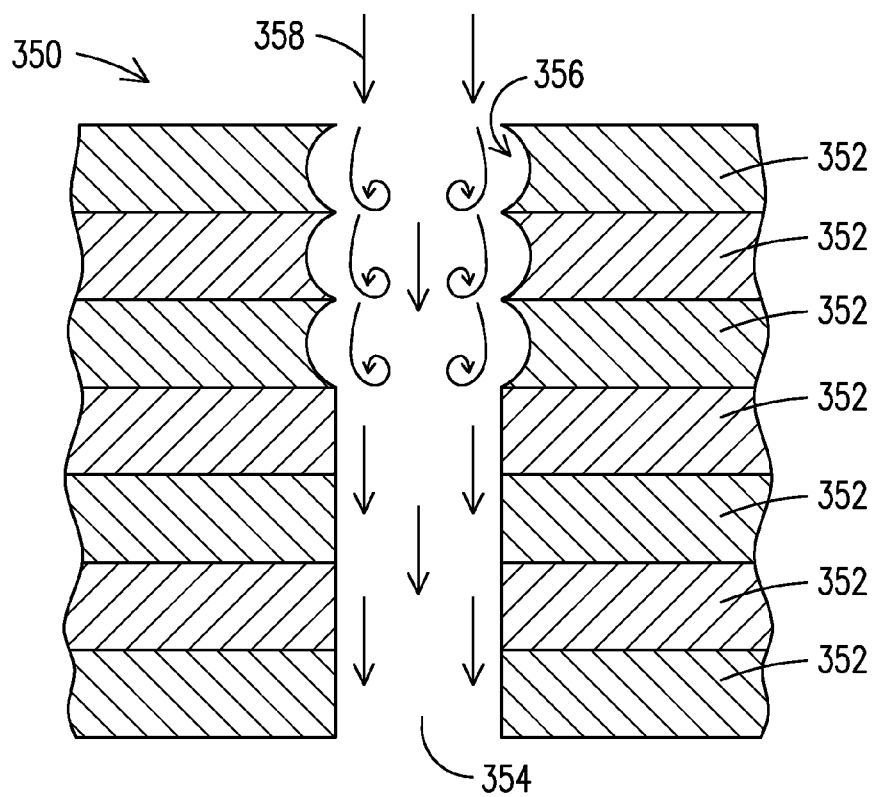
FIG. 21 is a cross-sectional view of a turbine component.

In addition to enabling unique cooling passage geometries and locations, the present invention allows the interior surface shape and finish of a component to be engineered and manufactured in ways not possible with prior art processes. For turbine applications, this provides the capability of engineering and manufacturing heat transfer and fluid dynamics features that do not currently exist. Co-pending U.S. application Ser. No. 12/541,610 filed on Aug. 14, 2009 and incorporated by reference herein describes manufacturing processes that are beneficially applied herein to industrial components such as gas turbines. FIGS. 18-20 illustrate three different non-rectangular edge profile configurations (isotropic, non-isotropic and tapered, respectively) that may be formed on a metallic foil. These shapes may be advantageously applied for heat transfer and fluid dynamics purposes to the interior and exterior surfaces of a component formed of a metallic foil stack in accordance with embodiments of the present invention. For example, FIG. 21 is a partial cross-sections view of a turbine component 350 formed of a stacked plurality of metallic foils 352 and including a cooling fluid passage 354. Depending upon the thickness of each foil, the edge configuration of each foil, and the overall cooling passage dimensions, the cooling passage may be engineered to provide a relatively smooth flow of the cooling fluid, as illustrated by the straight arrows, or it may include offsets between adjacent foils and/or non-rectangular edge profiles 356 that produce a desired degree of micro turbulence in the cooling fluid 358, as illustrated by the curled arrows. And while cooling passage interior turbulators are known in the art, they have previously been formed on a macro sized basis, i.e. the size of the turbulator may be on the order of magnitude of tenths or hundredths of an inch. The precise control of surface geometry that is provided by the present invention gives the designer of such components a degree of control over component performance that was unachievable with prior art design and manufacturing techniques, enabling turbulators sized on the order to 100 microns or less. Importantly, such surface features may be formed on non-linear interior surfaces of a component. The thickness of a particular metallic foil may be selected in response to the size of an interior surface feature that is desired. For example, in regions of a component where no particular surface irregularity is desired, a relatively thicker foil may be used, thereby minimizing the total number of foils that are needed. In regions of a component where very fine surface features are desired, relatively thinner foil may be used.

One may appreciate that as the thickness of the foil increases, the two-dimensional tolerance control is lessened due to edge shaping during the material removal etching processes. In counterbalance, making foils thinner increases the cost, number of possible fault planes, and may present material handling concerns. Thus, the designer will generally select the thickest foil possible while still satisfying the required dimensional tolerance limitations imposed on a particular region of a component.

The present invention further permits the potential manufacture of Oxide Dispersion Strengthened (ODS) alloy components or sub-components that could not have been manufactured using conventional powder metallurgy processes.

Figure 22:
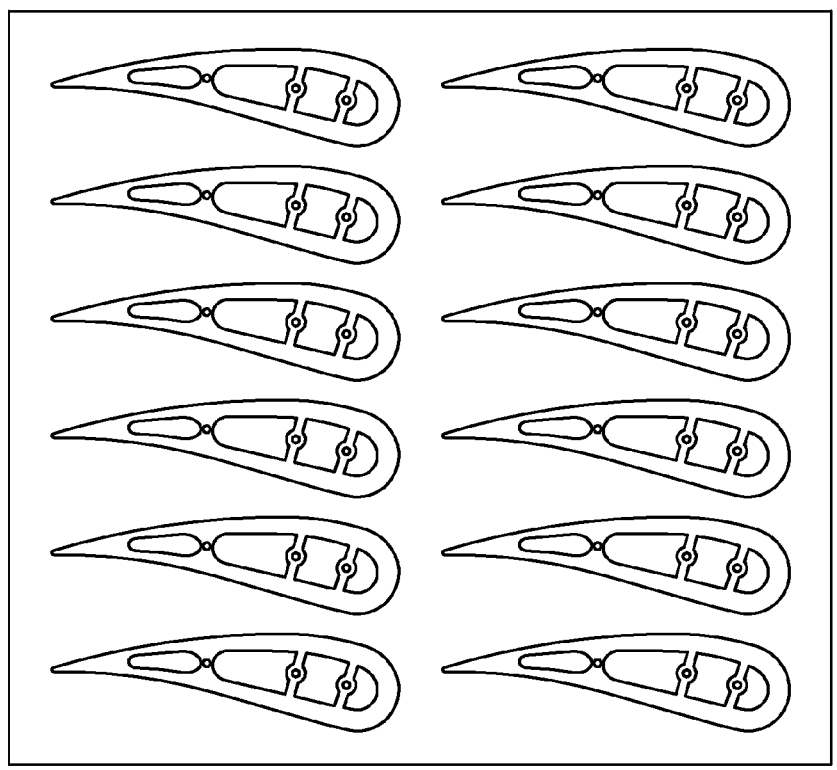
FIG. 22 is a plan view of a photo mask used in a lithography process for the production of a plurality of identical metallic foils corresponding to a single slice of a digital model of a component.

Known methods for producing components, particularly prototype components, are costly and time consuming because they require the manufacturing of tools and/or molds. Traditional tools and molds have a limited life because they are subject to mechanical wear and deterioration when used to produce the component. Rapid prototyping techniques have been developed where a laser is used to solidify a powder in response to a layered model of the desired product. However, such techniques are limited by the dimensional precision that can be achieved, by the limited choice of materials that can be used, and because they are useful to produce only one component at a time. The present invention overcomes these difficulties and may be used to produce a plurality of prototype components of great precision and repeatability. The present invention may be described as a digital tooling technique because the tooling used to form a component is in the form of a digital model and a plurality of photo masks, and is therefore essentially infinitely repeatable and infinitely durable such that a large number of identical components can be produced in parallel at relatively low cost and more rapidly than with prior art hard tooling methods. Once a component design is formed in digital form and is defined into a plurality of slices, a photo mask corresponding to each slice of the modeled component can be produced. Each photo mask may contain a plurality of copies of a 2-dimensional projection image of the respective slice, as shown in FIG. 22. The respective photo masks are then used in a photolithographic etching process to process foil blanks to produce etched foils, each single etched foil containing the plurality of copies of the respective three dimensional slices. The plurality of copies of etched foils are separated from their respective single etched foil and are joined with other foils formed in a similar process for the other component slices to form the plurality of copies of the three dimensional component. In this manner, multiple components can be formed in parallel, and each component is identical and is a "first press" of the digital tooling. This digital tooling process is not constrained by time or space, so that portions of the process may be done remotely from other portions of the process, with the digital information being transferred instantaneously and without degradation or shipping cost. This digital tooling does not degrade with use, and is capable of achieving dimensional accuracies that have not previously been obtained with prior art rapid prototyping or production tooling techniques. The methods described herein are particularly useful for development testing applications where multiple identical components must be produced to facilitate component testing. In contrast to prior art "rapid prototype production" methods, the present invention may be described as "rapid development production."

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims. The present invention is disclosed in context of a method for manufacturing a gas turbine component from highly worked high temperature foils and the resulting component produced therefrom. The principles of the present invention, however, are not limited to use with a gas turbine or within an electricity power production facility. For example, the methods and/or systems could be used within the aerospace or transportation industries or any other area where high temperature metallic components are utilized. One skilled in the art may find additional applications for the methods, systems, apparatus, and configurations disclosed herein. Thus the illustration and description of the present invention in context of the exemplary gas turbine component is merely one possible application of the present invention.

The invention claimed is:

1. A method of manufacturing a component, comprising:
   providing a three-dimensional computer model of a component to be produced;
   defining a plurality of model slices of the three-dimensional computer model;
   forming a plurality of metallic foils, where each foil corresponds to a specific one of the model slices;
   assembling the plurality of formed foils in a tool to form a three-dimensional component stack corresponding to the component to be produced; and
   bonding the foils of the three-dimensional component stack together to form the component;
   further comprising cold working the metallic foils to have a directionally oriented grain structure.

2. A method of manufacturing a component, comprising:
   providing a three-dimensional computer model of a component to be produced;
   defining a plurality of model slices of the three-dimensional computer model;
   forming a plurality of metallic foils, where each foil corresponds to a specific one of the model slices;
   assembling the plurality of formed foils in a tool to form a three-dimensional component stack corresponding to the component to be produced; and
   bonding the foils of the three-dimensional component stack together to form the component;
   wherein a plurality of the metallic foils are formed to have a directionally oriented grain structure, and a grain structure orientation of at least one of the metallic foils of the component stack is different than a grain structure orientation of another metallic foil of the component stack.

3. A method of manufacturing a component, comprising:
   providing a three-dimensional computer model of a component to be produced;
   defining a plurality of model slices of the three-dimensional computer model;
   forming a plurality of metallic foils, where each foil corresponds to a specific one of the model slices;
   assembling the plurality of formed foils in a tool to form a three-dimensional component stack corresponding to the component to be produced; and
   bonding the foils of the three-dimensional component stack together to form the component;
   wherein a material composition of at least one metallic foil of the component stack is selected to be different than a material composition of at least another metallic foil of the component stack.

4. A method of manufacturing a component, comprising:
   providing a three-dimensional computer model of a component to be produced;
   defining a plurality of model slices of the three-dimensional computer model;
   forming a plurality of metallic foils, where each foil corresponds to a specific one of the model slices;
   assembling the plurality of formed foils in a tool to form a three-dimensional component stack corresponding to the component to be produced; and
   bonding the foils of the three-dimensional component stack together to form the component;
   wherein a thickness of the foils is varied from a first portion of the component stack to a second portion of the component stack in response to a change in a degree of structural detail from the first portion of the component to the second portion of the component.

5. The method of claim 4, wherein shapes of the respective metallic foils are formed using a material removal process effective to control a dimension of an internal cavity of the component to a tolerance of ±25 microns.

6. The method of claim 4, further comprising forming a non-linear cooling passage through the component by forming holes in the respective metallic foils corresponding to respective locations of the cooling passage in respective model slices such that the holes in the assembled component stack define the non-linear cooling passage.

7. A gas turbine component formed by the method of claim 4.

8. A method of manufacturing a component, comprising:
   providing a three-dimensional computer model of a component to be produced;
   defining a plurality of model slices of the three-dimensional computer model;
   forming a plurality of metallic foils, where each foil corresponds to a specific one of the model slices;
   assembling the plurality of formed foils in a tool to form a three-dimensional component stack corresponding to the component to be produced; and
   bonding the foils of the three-dimensional component stack together to form the component;
   further comprising:
   defining the model slices around a curved portion of the component;
   forming each foil in a flat form corresponding to a flatten version of the respective model slice; and
   using a non-flat tool to assemble the foils into a form corresponding to the curved portion of the component.

9. The method of claim 8, further comprising:
   defining the model slices around a trailing edge portion of an airfoil component;
   forming each foil in a flat form corresponding to a flatten version of the respective model slice; and
   using a non-flat tool to assemble the foils into a form corresponding to the trailing edge portion of the airfoil component.

10. A method of manufacturing comprising:
    segmenting a model of a component into a plurality of three dimensional slices, wherein a thickness of any particular slice is selected in response to a degree of dimensional tolerance desired for a feature of the component included in that slice, such that a region of the component needing a relatively tighter dimensional tolerance is segmented into slices that are relatively thinner than the slices of a region of the component needing a relatively looser dimensional tolerance;
    controlling dimensional tolerances in two dimensions during a material removing process applied to each of a plurality of foil blanks to form foils corresponding to the respective slices; and
    joining the foils together to form the three dimensional component including the feature.

11. The method of claim 10, further comprising:
forming a photo mask corresponding to each slice of the modeled component, each photo mask containing a plurality of copies of a 2-dimensional projection image of the respective slice;
using the respective photo masks in a photolithographic etching process to process foil blanks to produce etched foils each containing the plurality of copies of the respective three dimensional slices;
separating the plurality of copies of each etched foils; and
joining the respective foils together to form the plurality of copies of the three dimensional component including the feature.

12. The method of claim 10, further comprising controlling the material removing process to create a desired profile for edges formed on the foil.

13. The method of claim 12, further comprising controlling the material removing process to create an edge profile that is isotropic, non-isotropic or tapered for a respective edge.

14. A method of manufacturing comprising:
modeling a component with a feature defined by an interior region of the component devoid of a material of construction of the component;
forming the component by bonding together a plurality of foils of the material of construction, wherein respective foils intersecting the interior region are formed prior to the bonding step to be devoid of the material of construction in the area of intersection; and
a thickness of a respective foil is selected to be effective to achieve a desired dimensional tolerance range for the feature in the formed component in response to a predetermined degree of two-dimensional tolerance control achievable during the foil forming step.

15. The method of claim 14, further comprising forming the foils to be devoid of the material of construction in the area of intersection by applying a lithographic etching process to remove material from respective foil blanks, and controlling the lithographic etching process to create a desired edge profile.

16. The method of claim 15, further comprising controlling the lithographic etching process to create an edge profile that is isotropic, non-isotropic or tapered for a respective edge.

17. An article of manufacture comprising a stacked plurality of metallic foils bonded together to form a component shape, with not all of the foils being identical;
wherein respective ones of the metallic foils are formed to have a directionally oriented grain structure, and a grain structure orientation of at least one of the stacked foils being different than a grain structure orientation of another of the stacked foils.

18. The article of claim 17, wherein the component shape comprises an airfoil, and further comprising at least one of the foils comprising an area of removed material defining part of a first non-linear cooling passage through a trailing edge portion of the airfoil.

19. The article of claim 18, wherein the first non-linear cooling passage passes proximate a pressure side of the airfoil, and further comprising at least one of the foils comprising an area of removed material defining part of a second non-linear cooling passage through the trailing edge portion of the airfoil proximate a suction side of the airfoil.

20. An article of manufacture comprising a stacked plurality of metallic foils bonded together to form a component shape, with not all of the foils being identical;
further comprising a material composition of at least one of the foils being different than a material composition of at least another of the foils.

21. An article of manufacture comprising a stacked plurality of metallic foils bonded together to form a component shape, with not all of the foils being identical;
further comprising a thickness of at least one of the foils being different than a thickness of at least another of the foils.

22. The article of claim 21, wherein the component shape comprises a curved portion formed by a plurality of curved metallic foils that have been bent around a form corresponding to the curved portion of the component shape.

23. The article of claim 21, further comprising at least one of the foils comprising an area of removed material defining part of a cooling passage through the component shape, wherein the area of removed material defines a non-rectangular edge configuration effective to produce a desired degree of turbulence in a cooling fluid passing through the cooling passage during use of the article.

24. An article of manufacture comprising a stacked plurality of metallic foils bonded together to form a component shape, with not all of the foils being identical;
further comprising an alignment tab formed on respective ones of the foils, an indexing feature of the alignment tabs being aligned with each other prior to bonding of the foils together to place the foils into proper position for forming the component shape.

25. The article of claim 24, wherein the component shape comprises an airfoil, and further comprising the bonded alignment tabs forming a rib between opposed pressure and suction walls of the airfoil.

26. The article of claim 24, wherein the bonded alignment tabs comprise a portion of a wall of an interior cavity formed in the component shape.

* * * * *